US012675496B2

(12) United States Patent
Wen et al.

(10) Patent No.: US 12,675,496 B2
(45) Date of Patent: Jul. 7, 2026

(54) DATA DISPLAY METHOD, READABLE MEDIUM, AND ELECTRONIC DEVICE

(71) Applicant: Beijing Volcano Engine Technology Co., Ltd., Beijing (CN)

(72) Inventors: Xiaokang Wen, Beijing (CN); Chenxi Ma, Beijing (CN); Lu Li, Beijing (CN); Danchi Fan, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/981,142

(22) Filed: Dec. 13, 2024

(65) Prior Publication Data

US 2025/0200059 A1     Jun. 19, 2025

(30) Foreign Application Priority Data

Dec. 14, 2023     (CN) .......................... 202311727622.X

(51) Int. Cl.
*G06F 16/00* (2019.01)
*G06F 16/248* (2019.01)
*G06F 16/26* (2019.01)

(52) U.S. Cl.
CPC ............ *G06F 16/248* (2019.01); *G06F 16/26* (2019.01)

(58) Field of Classification Search
CPC ............................... G06F 16/248; G06F 16/26
USPC .................................................. 707/600–899
See application file for complete search history.

(56) References Cited

U.S. PATENT DOCUMENTS

| | | | | |
|---|---|---|---|---|
| 8,112,458 B1 * | 2/2012 | Kumar | ............... | G06Q 30/0204 |
| | | | | 705/7.33 |
| 8,194,136 B1 * | 6/2012 | Askey | .................. | H04N 23/661 |
| | | | | 348/175 |
| 9,367,198 B2 * | 6/2016 | Radakovitz | ......... | G06F 3/04847 |
| 11,893,356 B1 * | 2/2024 | Yannam | ............... | G06F 3/0481 |
| 12,217,000 B1 * | 2/2025 | Setlur | ..................... | G06F 16/34 |

(Continued)

FOREIGN PATENT DOCUMENTS

| | | |
|---|---|---|
| CN | 112463954 A | 3/2021 |
| CN | 113704288 A | 11/2021 |

(Continued)

OTHER PUBLICATIONS

Office Action for Chinese Patent Application No. 202311727622.X, mailed on May 19, 2026, 14 pages.

*Primary Examiner* — Michelle N Owyang
(74) *Attorney, Agent, or Firm* — Astute IP Law Group

(57) ABSTRACT

The present disclosure relates to a data display method and apparatus, a readable medium, and an electronic device. The method includes: displaying a data query page, the data query page is at least configured to display a chart according to queried data, a configuration panel is displayed on the data query page, and a preset configuration item for querying data and for a user to select is displayed on the configuration panel; in response to a trigger operation on a first intelligent object on the data query page, hiding the configuration panel and displaying a first intelligent object page; and in response to target information input on the first intelligent object page, querying data according to the target information to obtain target data, and displaying a first data chart according to the target data.

20 Claims, 10 Drawing Sheets

Displaying a data query page    S101

In response to a trigger operation on a first intelligent object on the data query page, hiding the configuration panel while displaying a first intelligent object page    S102

In response to target information input on the first intelligent object page, querying data according to target information, and displaying a first data chart according to the target data    S103

(56)        References Cited

U.S. PATENT DOCUMENTS

| | | | |
|---|---|---|---|
| 2016/0012111 A1* | 1/2016 | Pattabhiraman | G06F 16/284 |
| | | | 707/722 |
| 2023/0086327 A1* | 3/2023 | Song | G06V 20/64 |
| | | | 382/159 |
| 2024/0045898 A1* | 2/2024 | Zhu | G06Q 30/0631 |
| 2025/0131045 A1* | 4/2025 | Jiang | G06F 16/9538 |

FOREIGN PATENT DOCUMENTS

| | | | |
|---|---|---|---|
| CN | 114238807 A | 3/2022 |
| CN | 114357147 A | 4/2022 |
| CN | 114742032 A | 7/2022 |
| CN | 114860737 A | 8/2022 |

* cited by examiner

Display name of field:
Region->Region name;
Number of people->Number of employees;
Duration-> Monthly working duration;

Field format: 
Monthly working duration: Two decimal places are retained

DATA DISPLAY METHOD, READABLE MEDIUM, AND ELECTRONIC DEVICE

CROSS-REFERENCE TO RELATED APPLICATION

This application claims the priority to and benefits of the Chinese Patent Application, No. 202311727622.X, which was filed on Dec. 14, 2023. The aforementioned patent application is hereby incorporated by reference in its entirety.

TECHNICAL FIELD

The present disclosure relates to the field of data processing technologies, and in particular, to a data display method and apparatus, a readable medium, and an electronic device.

BACKGROUND

In an actual business scenario, data often needs to be processed and analyzed, for example, data analysis is performed by using a data analysis platform. In the related art, the data analysis platform usually performs data analysis by using a modular and panel page structure. Taking a visualization module as an example, generation conditions such as a data dimension, a data indicator, a chart type, and a chart style need to be manually set to generate a data chart. However, to generate an understandable data chart, it is necessary to clearly understand the dimension and indicator of the data to be queried and have a clear cognition of the semantics of the chart. The operation is cumbersome and has a high threshold. An interactive link is long, and prone to errors, resulting in content that does not meet expectations.

SUMMARY

The Summary is to introduce the concepts in a simplified form, which will be described in detail in the following Detailed Description section. The Summary is not intended to identify the key features or essential features of the claimed technical solutions, nor is it intended to be used to limit the scope of the claimed technical solutions.

According to a first aspect, the present disclosure provides a data display method. The display method includes:

displaying a data query page, wherein the data query page is at least configured to display a chart according to queried data, a configuration panel is displayed on the data query page, and a preset configuration item for querying data and for a user to select is displayed on the configuration panel;

in response to a trigger operation on a first intelligent object on the data query page, hiding the configuration panel while displaying a first intelligent object page; and in response to target information input on the first intelligent object page, querying data according to the target information, to obtain target data, and displaying a first data chart according to the target data.

According to a second aspect, the present disclosure further provides a data display apparatus. The apparatus includes:

a first display module, configured to display a data query page, wherein the data query page is at least configured to display a chart according to queried data, a configuration panel is displayed on the data query page, and a preset configuration item for querying data and for a user to select is displayed on the configuration panel;

a second display module, configured to, in response to a trigger operation on a first intelligent object on the data query page, hide the configuration panel while display a first intelligent object page; and a display module, configured to in response to target information input on the first intelligent object page, query data according to the target information, to obtain target data, and display a first data chart according to the target data.

According to a third aspect, the present disclosure provides a computer-readable medium having stored thereon a computer program, wherein when the program is executed by a processing apparatus, the steps of the data display method according to any one of the first aspect are implemented.

According to a fourth aspect, the present disclosure provides an electronic device, including:

a storage apparatus having a computer program stored thereon; and a processing apparatus configured to execute the computer program in the storage apparatus, to implement the steps of the data display method according to any one of the first aspect.

By using the above technical solution, the data query page can be displayed, the data query page is at least configured to display the chart according to the queried data, the configuration panel is displayed on the data query page, and the preset configuration item for querying the data and for the user to select is displayed on the configuration panel. In addition, in response to the trigger operation on the first intelligent object on the data query page, the first intelligent object page can be displayed while the configuration panel is hidden, and then the data is queried according to the target information input on the first intelligent object page, to obtain the target data, and the first data chart is displayed according to the target data.

Other features and advantages of the present disclosure will be described in detail in the following specific embodiments.

BRIEF DESCRIPTION OF DRAWINGS

The above and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the drawings are schematic and that parts and elements are not necessarily drawn to scale. In the drawings.

DETAILED DESCRIPTION

Figure 1:
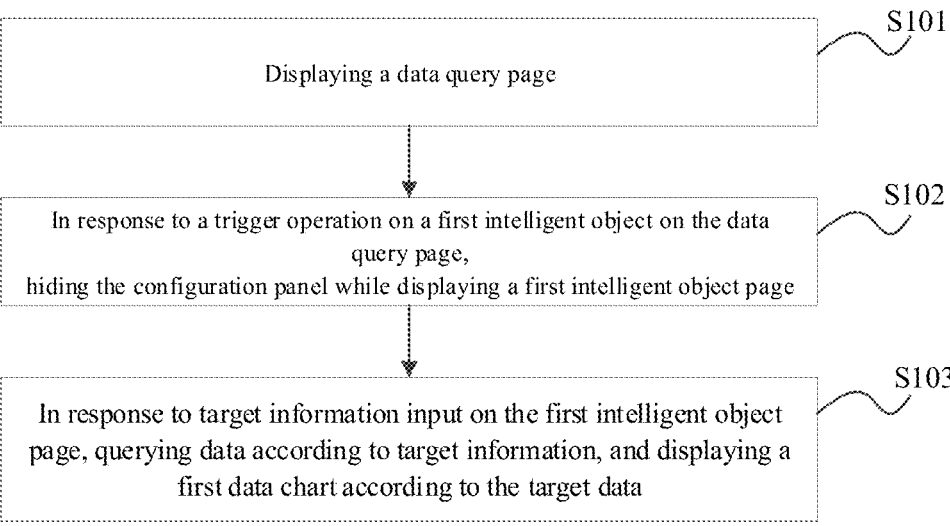
FIG. 1 is a schematic flowchart of a data display method according to an exemplary embodiment.

The embodiments of the present disclosure are described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, it should be understood as "one or more".

The names of messages or information exchanged between a plurality of apparatuses in the implementations of the present disclosure are used for illustrative purposes only, and are not used to limit the scope of these messages or information.

It may be understood that before using the technical solutions disclosed in the embodiments of the present disclosure, the types, scope of use, usage scenarios, and the like of personal information involved in the present disclosure shall be informed to the users and the users' authorization shall be obtained in an appropriate manner in accordance with the relevant laws and regulations.

For example, when a user actively requests, prompt information is sent to the user, to explicitly prompt the user that the operation requested by the user will require the user's personal information to be acquired and used. In this way, the user can independently choose whether to provide the personal information to the software or hardware such as the electronic device, the application, the server, or the storage medium that performs the operation of the technical solution of the present disclosure according to the prompt information.

As an optional but non-limiting implementation, in response to receiving a user's active request, the prompt information may be sent to the user in a pop-up window, and the prompt information may be presented in a text form in the pop-up window. In addition, the pop-up window may also carry a select control for the user to select "agree" or "disagree" to provide personal information to the electronic device.

It may be understood that the above process of notifying and obtaining the user authorization is merely illustrative, and does not constitute a limitation on the implementation of the present disclosure. Other manners that comply with relevant laws and regulations may also be applied to the implementation of the present disclosure.

In addition, it may be understood that data (including but not limited to the data itself, data acquisition, or data use) involved in the technical solution of the present disclosure shall comply with requirements of corresponding laws, regulations, and relevant provisions.

In an actual business scenario, data often needs to be processed and analyzed, for example, data analysis is performed by using a data analysis platform. The data analysis platform is a platform integrating data access, data processing, data storage, query and retrieval, analysis and mining, application interfaces, and the like, and different data analysis platforms may be set up for different application scenarios, for example, a data analysis platform for product sales.

In the related art, the data analysis platform usually performs data analysis by using a modular and panel page structure. Taking a visualization module as an example, configuration items such as dimension, indicator, chart type, and style are provided on a page, and a user configures chart generation conditions to generate a visual data chart. Generation conditions such as a data dimension, a data indicator, a chart type, and a chart style need to be manually set to generate a data chart. However, to generate an understandable data chart, it is necessary to clearly understand the dimension and indicator of the data to be queried and have a clear cognition of the semantics of the chart. The operation is cumbersome and has a high threshold. An interactive link is long, and prone to errors, resulting in content that does not meet expectations.

In view of this, the embodiments of the present disclosure provide a data display method and apparatus, a readable medium, and an electronic device, to solve the above technical problems.

The following further describes the embodiments of the present disclosure with reference to the accompanying drawings.

FIG. 1 is a flowchart of a data display method according to an exemplary embodiment of the present disclosure. Referring to FIG. 1, the data display method includes the following steps.

In S101, a data query page is displayed.

The data query page is at least configured to display a chart according to queried data, a configuration panel is displayed on the data query page, and a preset configuration item for querying data and selected by a user is displayed on the configuration panel.

Figure 2:
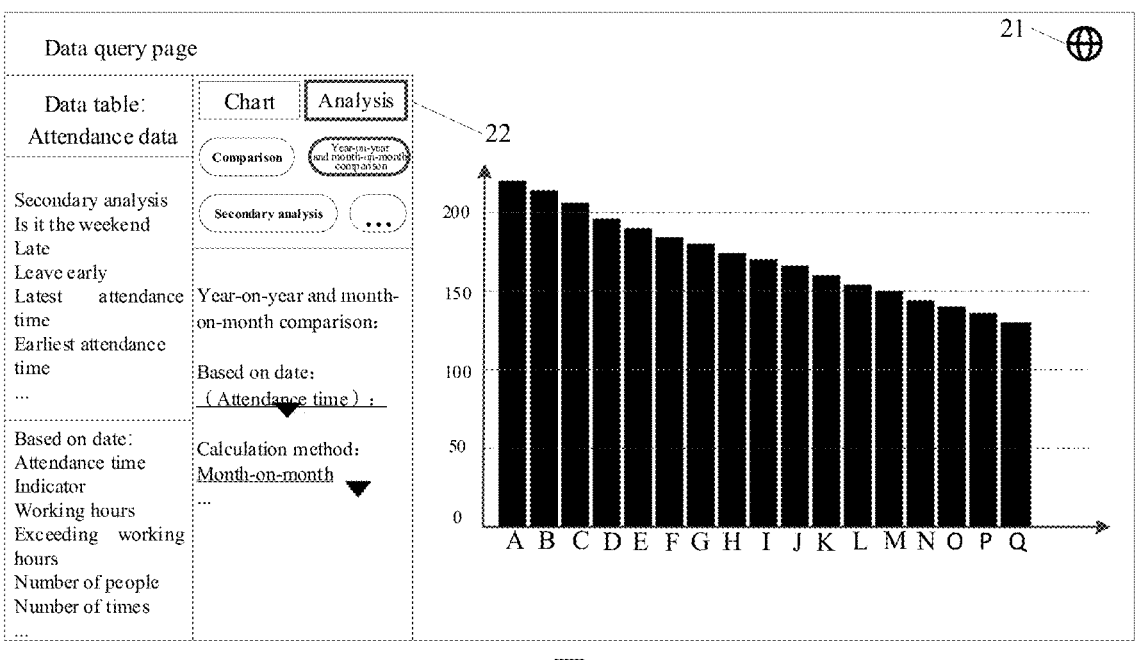
FIG. 2 is a schematic diagram of a data query page according to an exemplary embodiment.
Figure 2:
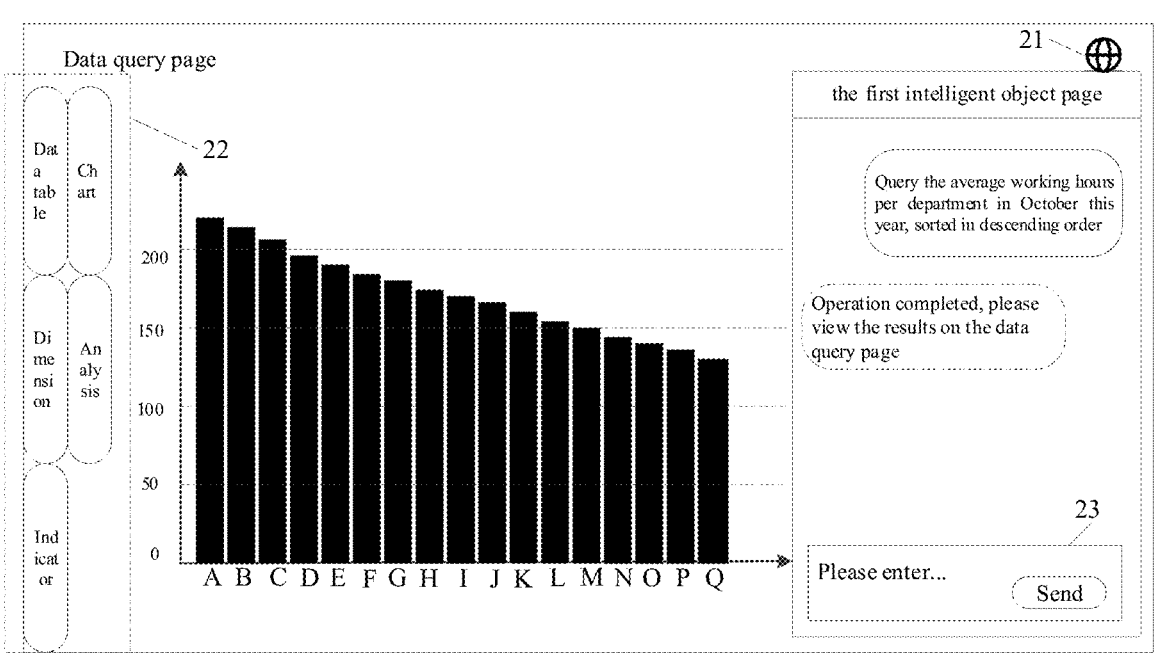

For example, as shown in FIG. 2, a configuration panel 22 is displayed on the data query page, and preset configuration items for querying data and selected by a user are displayed on the configuration panel 22, for example, configuration items for a dataset, a data dimension, a data indicator, a chart type, and data analysis. The specific configuration items may be set as required, which is not limited in the present disclosure.

For example, the data analysis may include: data comparison, for example, comparing sales differences in September and October; data year-on-year and month-on-month comparison, for example, a change ratio compared with sales in the same month of last year; adding a reference line, for example, intuitively displaying a comparison between sales in various regions and a target sales; performing table calculation, for example, performing table calculation on a table-type chart; performing cluster analysis, for example, clustering data in regions such as East China and Northeast China; performing data prediction, for example, predicting sales in various regions in the next month; and performing secondary analysis, for example, performing secondary analysis on the data chart. The specific configuration items may be set as required, which is not limited in the present disclosure.

In S102, in response to a trigger operation on a first intelligent object on the data query page, the configuration panel is hidden while a first intelligent object page is displayed.

For example, with reference to FIG. 2, the first intelligent object 21 may be triggered to hide the configuration panel 22 and at the same time display the first intelligent object page. The trigger operation may be a trigger operation such as a click or a shortcut key. This is not limited in the present disclosure.

It should be noted that the intelligent object may be an agent that integrates at least one data generation model. The agent can receive information in a format such as text, voice, or an image that is input from the outside, and process the received information such as text, voice, or an image by using the integrated data generation model, to determine target data, for example, a data dimension and a data indicator, and then generate a data chart corresponding to the information or knowledge information related to the data chart.

In a possible manner, the data display method further includes: in response to a close operation on the first intelligent object page, closing the first intelligent object page while expanding and displaying the configuration panel on the data query page.

For example, with reference to FIG. 2, the first intelligent object page may be closed by clicking the first intelligent object 21, and the configuration panel 22 is expanded and displayed. Alternatively, any menu on the configuration panel 22 is clicked to close the first intelligent object page and expand the configuration panel 22. This is not limited in the present disclosure.

In this way, manual configuration items such as a dataset, dimension data, indicator data, a chart type, and data analysis can be compatible, and a page framework is expanded or hidden according to a user operation, to meet the use requirements of different users.

In S103, in response to target information input on the first intelligent object page, data is queried according to the target information to obtain target data, and a first data chart is displayed according to the target data.

By using the method, the data can be queried by using the configuration panel or the first intelligent object as required. In addition, the first intelligent object can be used to query the data and display the visual data chart in a chat manner, which simplifies the interactive operation in the data chart display process. The interactive link is short, which can improve the display efficiency of the data chart and improve the user experience.

In a possible manner, in response to target information input on the first intelligent object page, querying data according to the target information to obtain the target data may include: when an information input control is displayed on the first intelligent object page, in response to the target information input on the information input control, querying data according to the target information to obtain the target data; or when a preset data query question is displayed on the first intelligent object page, in response to a trigger operation on a target query question in the preset data query question, using the target query question as the target information, and querying data according to the target information to obtain the target data.

For example, the target information may be input in an information input control 23 on the first intelligent object page shown in FIG. 2, and then the data is queried according to the target information, to obtain the target data. That is, all functions in the configuration panel can be implemented in a chat manner. In this way, the user does not need to manually configure the data dimension and the data indicator based on the semantics of the chart, and the data dimension and the data indicator of the target data can be determined by using the natural language input by the user, and then the corresponding data chart is displayed, so that the interactive operation in the data chart display process can be simplified, and the user's cognitive burden can be reduced.

Figure 3:
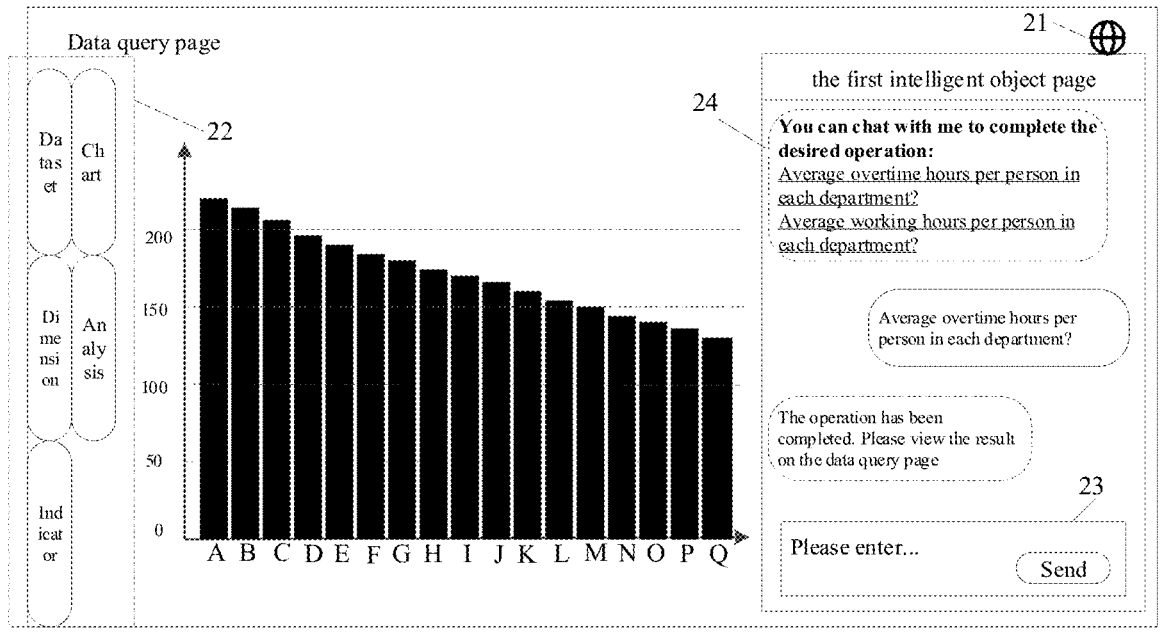
FIG. 3 is a schematic diagram of a first intelligent object page according to an exemplary embodiment.

Alternatively, as shown in FIG. 3, a preset data query question 24 is displayed on the first intelligent object page, and then the target query question is used as the target information, and then the data is queried according to the target information, to obtain the target data.

In other words, the preset data query question may be recommended to the user for the user to select. The preset data query question may be a preset question, or a question predicted by using a cold start algorithm, or the like. This is not limited in the present disclosure. In this way, the user can perform a data operation by triggering the target query question, which is simple to operate and improves the data processing efficiency.

In a possible manner, the data display method further includes: after the first data chart is displayed, in response to data analysis information for the first data chart that is input on the first intelligent object page, displaying a data analysis result and an operation control for the data analysis result on the first intelligent object page, wherein the data analysis result is obtained by analyzing data in the first data chart based on the data analysis information; and in response to a trigger operation on the operation control, performing a target operation corresponding to the operation control on the data analysis result.

Figure 4:
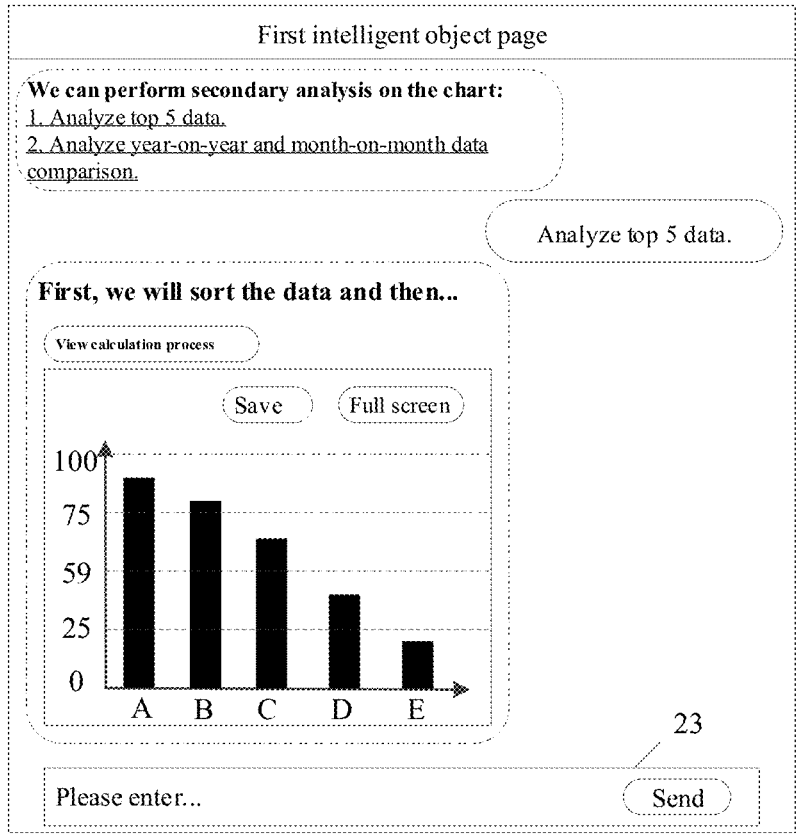
FIG. 4 is a schematic diagram of data analysis according to an exemplary embodiment.

For example, with reference to FIG. 4, the data analysis information for the first data chart may be input in the information input control 23, or a target analysis option may be selected from displayed preset analysis options as the data analysis information for the first data chart. The preset analysis options may be automatically displayed after the first data chart is displayed, or may be displayed after a secondary analysis control shown in FIG. 2 is triggered. In addition, the preset analysis options may be determined based on an actual business scenario. This is not limited in the present disclosure.

Then, with continued reference to FIG. 4, data analysis is performed on the first data chart based on the data analysis information, to obtain the data analysis result. The data analysis result may include a data analysis process and a data chart obtained after secondary analysis. This is not limited in the present disclosure. The operation control for the data analysis result includes a control for viewing an analysis calculation process, a control for saving the data analysis result, a control for full-screen display, and the like. This is not limited in the present disclosure.

It should be noted that in addition to the data analysis information shown in FIG. 4, the data analysis function displayed in the configuration panel shown in FIG. 2 may also be implemented by inputting other data analysis information, for example, viewing year-on-year and month-on-month data comparison. Details are not described herein again in the present disclosure.

In other words, the embodiments of the present disclosure support reanalyzing the queried data by using a multi-round chat method, and generating a corresponding visual data chart, which is simple to operate, has high data processing efficiency, reduces the user's cognitive burden, and is not prone to errors.

In a possible manner, displaying an operation control for the data analysis result on the first intelligent object page may include: displaying a save control for the data analysis result on the first intelligent object page. The responding to a trigger operation on the operation control and performing a target operation corresponding to the operation control on the data analysis result may include: in response to a trigger operation on the save control, displaying a result save page; and in response to save information configured on the result save page, saving the data analysis result according to the save information.

Figure 5:
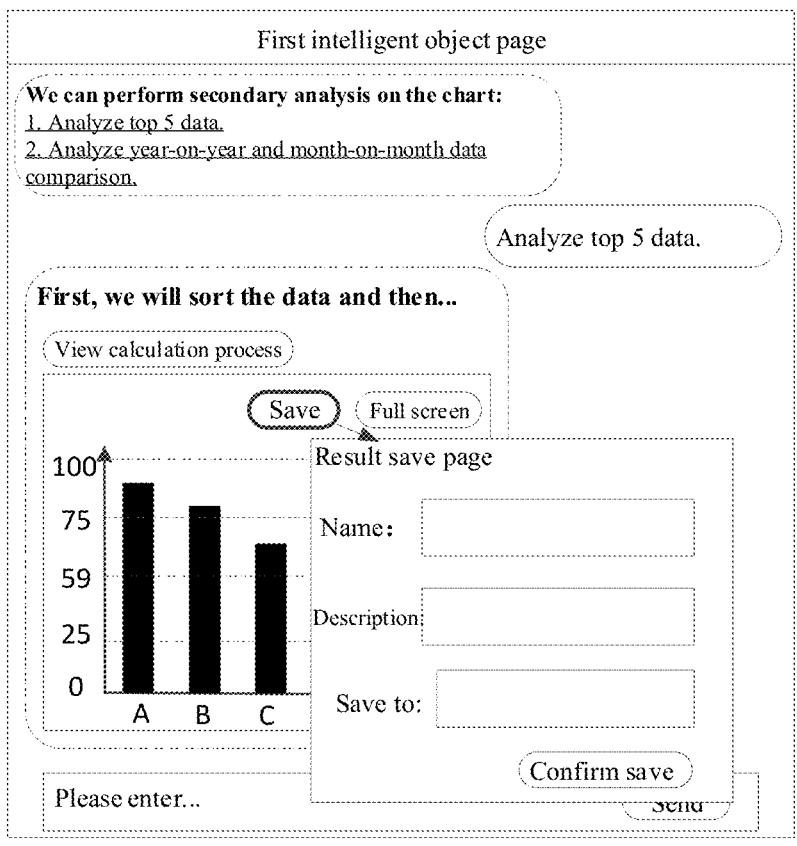
FIG. 5 is a schematic diagram of a result save page according to an exemplary embodiment.

For example, with reference to FIG. 5, the save control for the data analysis result is displayed on the first intelligent object page, and the result save page is displayed in response to a trigger operation on the save control. Information such as a name, a description, and a save location may be entered on the result save page, which may be set as required. This is not limited in the present disclosure. Then, the data analysis result is saved according to the save information. In this way, the data analysis result can be saved, for example, saved as a dashboard or the like.

In a possible manner, displaying an operation control for the data analysis result on the first intelligent object page may include: displaying a full-screen control for the data analysis result on the first intelligent object page. The responding to a trigger operation on the operation control and performing a target operation corresponding to the operation control on the data analysis result may include: in response to a trigger operation on the full-screen control, displaying the data analysis result in full screen.

For example, with reference to FIG. 4, the full-screen control for the data analysis result is displayed on the first intelligent object page, and the data analysis result is displayed in full screen in response to a trigger operation on the full-screen control, so that the data analysis result can be conveniently viewed.

Figure 6:
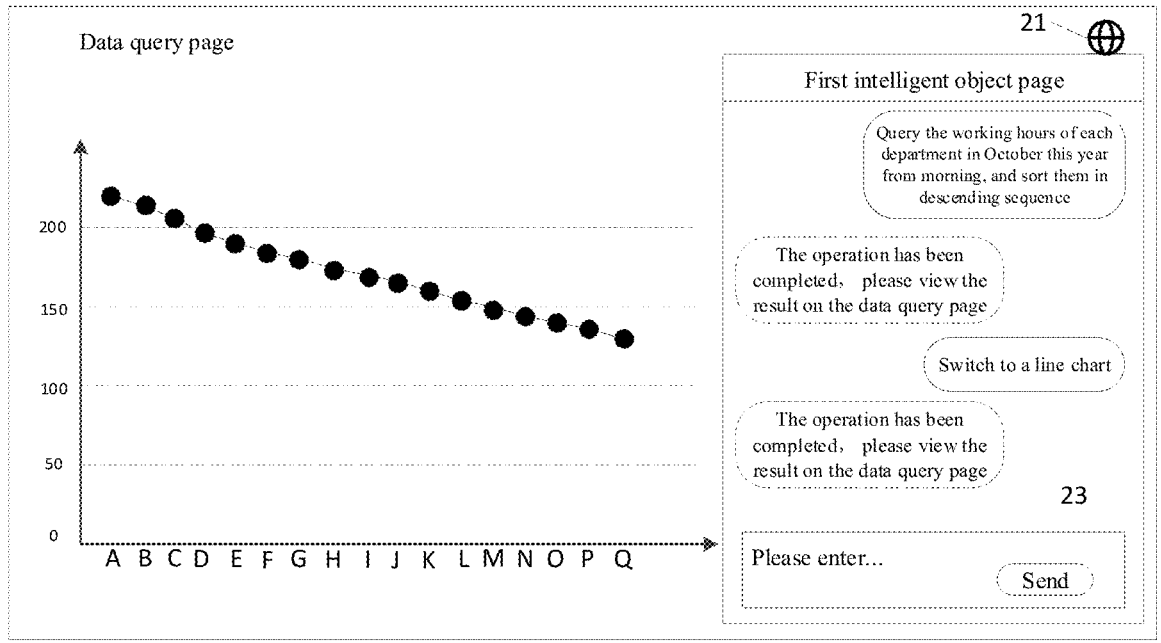
FIG. 6 is a schematic diagram of chart type switching according to an exemplary embodiment.

It should be noted that in addition to performing data analysis on the first data chart, as shown in FIG. 6, the chart type of the data chart may also be switched, that is, other functions such as switching the data chart may also be implemented in a chat manner. It should be understood that when the first data chart is displayed for the first time, the first data chart may be displayed according to a default chart style, where the default chart style may be a table, a line chart, a bar chart, a sector chart, or the like. This is not limited in the present disclosure. In addition, after the first data chart is generated, other input information may be input to generate another data chart. The specific setting may be performed as required. This is not limited in the present disclosure.

In a possible manner, a first configuration control is displayed on the data query page, and the data display method further includes: in response to a trigger operation on the first configuration control, modifying a data display manner of the first data chart while keeping a chart type of the first data chart, and updating the first configuration control to a view control; and in response to a trigger operation on the view control, displaying an information panel in a floating manner on a layer above the data query page, wherein the information panel is used for displaying modification description information about the data display manner.

Figure 7:
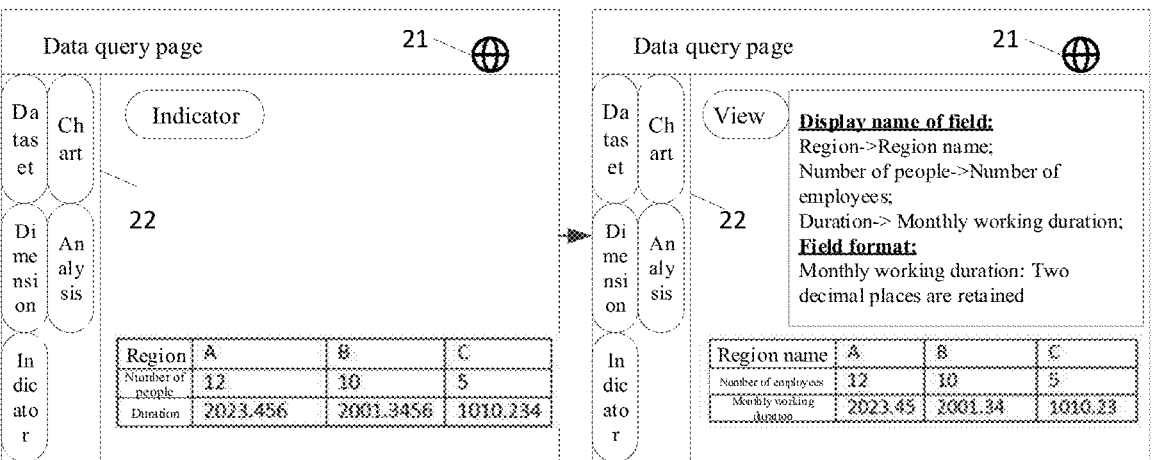
FIG. 7 is a schematic diagram of an information panel according to an exemplary embodiment.

For example, the first configuration control is displayed on the data query page, for example, a "one-click optimization" control shown in FIG. 7. With continued reference to FIG. 7, in response to a trigger operation on the "one-click optimization" control, the data display manner of the first data chart is modified according to an optimization configuration corresponding to "one-click optimization" while the chart type of the first data chart is kept, and the first configuration control is updated to the view control. Then, in response to a trigger operation on the view control, the information panel is displayed in a floating manner on the layer above the data query page, and the information panel is used for displaying the modification description information about the data display manner, that is, the corresponding optimization configuration, for example, optimization for a field name, optimization for a field format, and the like. In this way, the field and format of the data chart can be optimized, and the aesthetics of the data chart is improved, thereby improving the user experience.

It should be noted that the trigger operation on the view control may be a hover operation or a click operation. This is not limited in the present disclosure. In addition, the information panel may also be displayed in a floating manner on the layer above the data query page when the mouse hovers over the "one-click optimization" control, so that the user can intuitively understand the optimization configuration to determine whether the data chart needs to be optimized.

In a possible manner, a second configuration control is displayed on the information panel, the second configuration control is configured to perform or undo modification on the data display manner, and after the data display manner of the first data chart is modified, the second configuration control is displayed in an enabled state, and the data display method further includes: when the second configuration control is displayed in the enabled state, in response to a trigger operation on the second configuration control, displaying the second configuration control in a disabled state, and undoing the modification on the data display manner based on the modification description information; and when the second configuration control is displayed in the disabled state, in response to a trigger operation on the second configuration control, displaying the second configuration control in the enabled state, and modifying the data display manner of the first data chart based on the modification description information.

Figure 8:
FIG. 8 is a schematic diagram of another information panel according to an exemplary embodiment.

For example, with reference to FIG. 8, the second configuration control is displayed on the information panel, and the second configuration control is configured to perform or undo the modification on the data display manner. In addition, the information panel shown in FIG. 7 may be displayed when the mouse hovers over the "one-click optimization" control, and the information panel shown in FIG. 8 may be displayed when the "one-click optimization" control is clicked. This is not limited in the present disclosure.

For example, with continued reference to FIG. 8, after the data display manner of the first data chart is modified, the second configuration control is displayed in the enabled state, indicating that the modification corresponding to the second configuration control takes effect. The corresponding modification may be undone by closing the second configuration control, or the data display manner of the first data chart may be modified based on the modification description information by reopening the second configuration control. In this way, the data display manner of the first data chart can be flexibly modified or the modification can be undone, which is simple to operate, improves the user experience, and improves the display efficiency of the data chart.

It should be understood that a general configuration control may be set for the modification description information, or a corresponding configuration control may be set for different types of modification description information, for example, a configuration control for a field name and a field format. Alternatively, a corresponding configuration control may be set for a sub-item in each type, or the like. This is not limited in the present disclosure.

It should be noted that the modification description information may be set by default by the system or configured by the user, and the modification description information may also be displayed in an editable mode, that is, the user can perform an edit operation on the modification description information, for example, changing a region name to a city name, or the like. This is not limited in the present disclosure.

It should be noted that in the pages shown in FIG. 2 to FIG. 8, the page style, layout, menu name, field name, control name, and the like are merely used as an example, which may be specifically set as required. This is not limited in the present disclosure.

Figure 9:
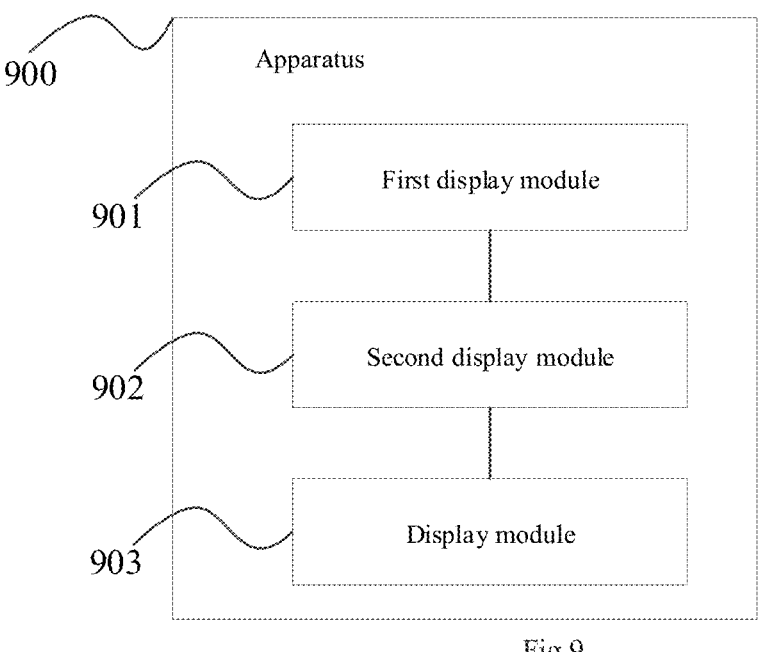
FIG. 9 is a block diagram of a data display apparatus according to an exemplary embodiment.

Based on the same inventive concept, the present disclosure further provides a data display apparatus. Referring to FIG. 9, the data display apparatus 900 includes:

a first display module 901, configured to display a data query page, wherein the data query page is at least configured to display a chart according to queried data, a configuration panel is displayed on the data query page, and a preset configuration items for querying data and for a user to select is displayed on the configuration panel;

a second display module 902, configured to, in response to a trigger operation on a first intelligent object on the data query page, hide the configuration panel while display a first intelligent object page; and a display module 903, configured to in response to target information input on the first intelligent object page, query data according to the target information to obtain target data, and display a first data chart according to the target data.

By using the above apparatus, the data can be queried by using the configuration panel or the first intelligent object as required. In addition, the first intelligent object can be used to query the data and display the visual data chart in a chat manner, which simplifies the interactive operation in the data chart display process. The interactive link is short, which can improve the display efficiency of the data chart and improve the user experience.

Optionally, the data display apparatus 900 further includes a close module configured to:

in response to a close operation on the first intelligent object page, close the first intelligent object page while expand and display the configuration panel on the data query page.

Optionally, a first configuration control is displayed on the data query page, and the data display apparatus 900 further includes a first configuration module configured to:

in response to a trigger operation on the first configuration control, modify a data display manner of the first data chart while keeping a chart type of the first data chart, and update the first configuration control to a view control; and in response to a trigger operation on the view control, display an information panel in a floating manner on a layer above the data query page, wherein the information panel is used for displaying modification description information about the data display manner.

Optionally, a second configuration control is displayed on the information panel, the second configuration control is configured to perform or undo the modification on the data display manner, and after the data display manner of the first data chart is modified, the second configuration control is displayed in an enabled state, and the data display apparatus 900 further includes a second configuration module configured to:

when the second configuration control is displayed in the enabled state, in response to a trigger operation on the second configuration control, display the second configuration control in a disabled state, and undo the modification on the data display manner based on the modification description information; and when the second configuration control is displayed in the disabled state, in response to a trigger operation on the second configuration control, display the second configuration control in the enabled state, and modify the data display manner of the first data chart based on the modification description information.

Optionally, the data display apparatus 900 further includes:

an analysis module configured to, after the first data chart is displayed, in response to data analysis information for the first data chart that is input on the first intelligent object page, display a data analysis result and an operation control for the data analysis result on the first intelligent object page, wherein the data analysis result is obtained by analyzing data in the first data chart based on the data analysis information; and an execution module configured to, in response to a trigger operation on the operation control, perform a target operation corresponding to the operation control on the data analysis result.

Optionally, the analysis module is configured to:

display a save control for the data analysis result on the first intelligent object page; and the execution module is configured to:

in response to a trigger operation on the save control, display a result save page; and in response to save information configured on the result save page, save the data analysis result according to the save information.

Optionally, the analysis module is configured to:

display a full-screen control for the data analysis result on the first intelligent object page; and the execution module is configured to:

in response to a trigger operation on the full-screen control, display the data analysis result in full screen.

For the apparatus in the foregoing embodiments, the specific manner in which each module performs an operation has been described in detail in the embodiments related to the method, and will not be described in detail here.

Based on the same concept, an embodiment of the present disclosure further provides a computer-readable medium, having stored thereon a computer program that, when executed by a processing apparatus, implements the steps of the data display method described above.

Based on the same concept, an embodiment of the present disclosure further provides an electronic device, including:

a storage apparatus having a computer program stored thereon; and a processing apparatus configured to execute the computer program in the storage apparatus, to implement the steps of the data display method described above.

Figure 10:
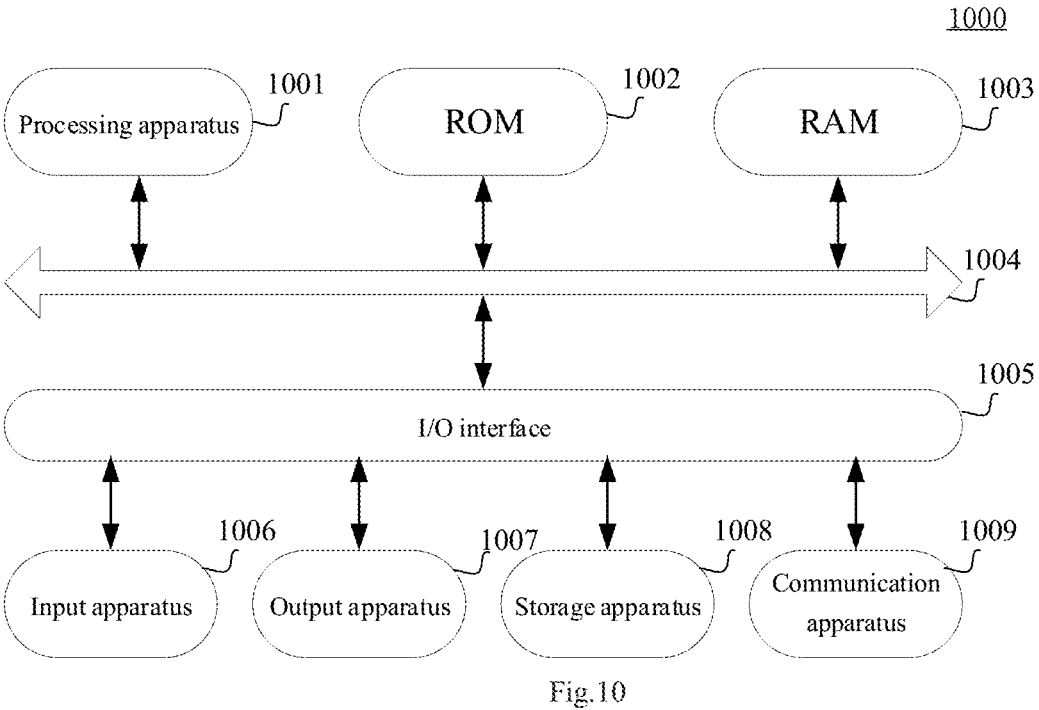
FIG. 10 is a block diagram of an electronic device according to an exemplary embodiment.

Referring to FIG. 10 below, FIG. 10 is a schematic diagram of a structure of an electronic device 1000 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 10 is merely an example and should not impose any limitation on the function and scope of use of the embodiments of the present disclosure.

As shown in FIG. 10, the electronic device 1000 may include a processing apparatus (for example, a central processor, a graphics processor, or the like) 1001 that may perform a variety of appropriate actions and processing in accordance with a program stored in a read-only memory (ROM) 1002 or a program loaded from a storage apparatus 1008 into a random access memory (RAM) 1003. The RAM 1003 further stores various programs and data required for the operation of the electronic device 1000. The processing apparatus 1001, the ROM 1002, and the RAM 1003 are connected to each other through a bus 1004. An input/output (I/O) interface 1005 is also connected to the bus 1004.

Generally, the following apparatuses may be connected to the I/O interface 1005: an input apparatus 1006 including, for example, a touch screen, a touchpad, a keyboard, a mouse, a camera, a microphone, an accelerometer, and a gyroscope; an output apparatus 1007 including, for example, a liquid crystal display (LCD), a speaker, and a vibrator; the storage apparatus 1008 including, for example, a tape and a hard disk; and a communication apparatus 1009. The communication apparatus 1009 may allow the electronic device 1000 to perform wireless or wired communication with other devices to exchange data. Although FIG. 10 shows the electronic device 1000 having various apparatuses, it should be understood as an illustration, and it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 1009 and installed, or installed from the storage apparatus 1008, or installed from the ROM 1002. When the computer program is executed by the processing apparatus 1001, the above-mentioned functions defined in the method of the embodiment of the present disclosure are performed.

It should be noted that the computer-readable medium described above in the present disclosure may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program that may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), or the like, or any suitable combination thereof.

In some implementations, communication may be performed using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: display a data query page, wherein the data query page is at least configured to display a chart according to queried data, a configuration panel is displayed on the data query page, and a preset configuration item for querying data and for a user to select is displayed on the configuration panel; in response to a trigger operation on a first intelligent object on the data query page, hide the configuration panel while display a first intelligent object page; and query data according to target information input on the first intelligent object page, to obtain target data, and display a first data chart according to the target data.

The computer program code for performing the operations in the present disclosure may be written in one or more programming languages or a combination thereof, where the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case involving the remote computer, the remote computer may be connected to the computer of the user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession may actually be executed substantially in parallel, or they may sometimes be executed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules involved in the embodiments described in the present disclosure may be implemented by software, or may be implemented by hardware. The name of a module does not constitute a limitation on the module in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

The foregoing descriptions are merely preferred embodiments of the present disclosure and explanations of the applied technical principles. Persons skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by replacing the foregoing features with technical features with similar functions disclosed in the present disclosure (but not limited thereto).

In addition, although the various operations are depicted in a specific order, it should be understood as requiring these operations to be performed in the specific order shown or in a sequential order. Under specific circumstances, multitasking and parallel processing may be advantageous. Similarly, although several specific implementation details are included in the foregoing discussions, these details should not be construed as limiting the scope of the present disclosure. Some features that are described in the context of separate embodiments may alternatively be implemented in combination in a single embodiment. In contrast, various features described in a single embodiment may alternatively be implemented in a plurality of embodiments individually or in any suitable subcombination.

Although the subject matter has been described in a language specific to structural features and/or logical actions of the method, it should be understood that the subject matter specified in the appended claims is not necessarily limited to the specific features or actions described above. On the contrary, the specific features and actions described above are merely exemplary forms of implementing the claims. For the apparatus in the foregoing embodiments, the specific manner in which each module performs an operation has been described in detail in the embodiments related to the method, and will not be described in detail here.

The invention claimed is:

1. A data display method, comprising:
   displaying a data query page, wherein the data query page is at least configured to display a chart according to queried data, a configuration panel is displayed on the data query page, and a preset configuration item for querying data and for user selection is displayed on the configuration panel;
   in response to a trigger operation on a first intelligent object on the data query page, hiding the configuration panel while displaying a first intelligent object page, wherein the first intelligent object is an agent that integrates at least one data generation model, and the first intelligent object page is configured to display a process of querying the data in a chat manner; and
   in response to first information that is input on the first intelligent object page, querying data according to the first information to obtain first data, and displaying a first data chart according to the first data.

2. The data display method according to claim 1, further comprising:

in response to a close operation on the first intelligent object page, closing the first intelligent object page while expanding and displaying the configuration panel on the data query page.

3. The data display method according to claim 1, wherein a first configuration control is displayed on the data query page, and the data display method further comprises:

in response to a trigger operation on the first configuration control, modifying a data display manner of the first data chart while keeping a chart type of the first data chart, and updating the first configuration control to a view control; and in response to a trigger operation on the view control, displaying an information panel in a floating manner on a layer above the data query page, wherein the information panel is used for displaying modification description information about the data display manner.

4. The data display method according to claim 3, wherein a second configuration control is displayed on the information panel, the second configuration control is configured to perform or undo modification on the data display manner, and after the data display manner of the first data chart is modified, the second configuration control is displayed in an enabled state, and the data display method further comprises:

when the second configuration control is displayed in the enabled state, in response to a trigger operation on the second configuration control, displaying the second configuration control in a disabled state, and undoing the modification on the data display manner based on the modification description information; and when the second configuration control is displayed in the disabled state, in response to a trigger operation on the second configuration control, displaying the second configuration control in the enabled state, and modifying the data display manner of the first data chart based on the modification description information.

5. The data display method according to claim 1, wherein the data display method further comprises:

after the first data chart is displayed, in response to data analysis information for the first data chart that is input on the first intelligent object page, displaying a data analysis result and an operation control for the data analysis result on the first intelligent object page, wherein the data analysis result is obtained by analyzing data in the first data chart based on the data analysis information; and in response to a trigger operation on the operation control, performing a first operation corresponding to the operation control on the data analysis result.

6. The data display method according to claim 5, wherein the displaying an operation control for the data analysis result on the first intelligent object page comprises:

displaying a save control for the data analysis result on the first intelligent object page; and in response to the trigger operation on the operation control, the performing a first operation corresponding to the operation control on the data analysis result comprises:

in response to a trigger operation on the save control, displaying a result save page; and in response to save information configured on the result save page, saving the data analysis result according to the save information.

7. The data display method according to claim 5, wherein the displaying an operation control for the data analysis result on the first intelligent object page comprises:

displaying a full-screen control for the data analysis result on the first intelligent object page; and in response to the trigger operation on the operation control, the performing a first operation corresponding to the operation control on the data analysis result comprises:

in response to a trigger operation on the full-screen control, displaying the data analysis result in full screen.

8. A non-transitory computer-readable medium having stored thereon a computer program, wherein when the computer program is executed by a processing apparatus, the steps of a data display method are implemented, and the data display method comprises:

displaying a data query page, wherein the data query page is at least configured to display a chart according to queried data, a configuration panel is displayed on the data query page, and a preset configuration item for querying data and for user selection is displayed on the configuration panel;

in response to a trigger operation on a first intelligent object on the data query page, hiding the configuration panel while displaying a first intelligent object page, wherein the first intelligent object is an agent that integrates at least one data generation model, and the first intelligent object page is configured to display a process of querying the data in a chat manner; and in response to first information that is input on the first intelligent object page, querying data according to the first information to obtain first data, and displaying a first data chart according to the first data.

9. An electronic device, comprising:

a memory having a computer program stored thereon; and a processor configured to execute the computer program in the memory, to implement the steps of a data display method, and the data display method comprising:

displaying a data query page, wherein the data query page is at least configured to display a chart according to queried data, a configuration panel is displayed on the data query page, and a preset configuration item for querying data and for a user selection is displayed on the configuration panel;

in response to a trigger operation on a first intelligent object on the data query page, hiding the configuration panel while displaying a first intelligent object page, wherein the first intelligent object is an agent that integrates at least one data generation model, and the first intelligent object page is configured to display a process of querying the data in a chat manner; and in response to first information that is input on the first intelligent object page, querying data according to the first information to obtain first data, and displaying a first data chart according to the first data.

10. The electronic device according to claim 9, wherein the data display method further comprises:

in response to a close operation on the first intelligent object page, closing the first intelligent object page while expanding and displaying the configuration panel on the data query page.

11. The electronic device according to claim 9, wherein a first configuration control is displayed on the data query page, and the data display method further comprises:

in response to a trigger operation on the first configuration control, modifying a data display manner of the first data chart while keeping a chart type of the first data chart, and updating the first configuration control to a view control; and in response to a trigger operation on the view control, displaying an information panel in a floating manner on a layer above the data query page, wherein the information panel is used for displaying modification description information about the data display manner.

12. The electronic device according to claim 11, wherein a second configuration control is displayed on the information panel, the second configuration control is configured to perform or undo modification on the data display manner, and after the data display manner of the first data chart is modified, the second configuration control is displayed in an enabled state, and the data display method further comprises:

when the second configuration control is displayed in the enabled state, in response to a trigger operation on the second configuration control, displaying the second configuration control in a disabled state, and undoing the modification on the data display manner based on the modification description information; and when the second configuration control is displayed in the disabled state, in response to a trigger operation on the second configuration control, displaying the second configuration control in the enabled state, and modifying the data display manner of the first data chart based on the modification description information.

13. The electronic device according to claim 9, wherein the data display method further comprises:

after the first data chart is displayed, in response to data analysis information for the first data chart that is input on the first intelligent object page, displaying a data analysis result and an operation control for the data analysis result on the first intelligent object page, wherein the data analysis result is obtained by analyzing data in the first data chart based on the data analysis information; and in response to a trigger operation on the operation control, performing a first operation corresponding to the operation control on the data analysis result.

14. The electronic device according to claim 13, wherein the displaying an operation control for the data analysis result on the first intelligent object page comprises:

displaying a save control for the data analysis result on the first intelligent object page; and in response to the trigger operation on the operation control, the performing a first operation corresponding to the operation control on the data analysis result comprises:

in response to a trigger operation on the save control, displaying a result save page; and in response to save information configured on the result save page, saving the data analysis result according to the save information.

15. The electronic device according to claim 13, wherein the displaying an operation control for the data analysis result on the first intelligent object page comprises:

displaying a full-screen control for the data analysis result on the first intelligent object page; and in response to the trigger operation on the operation control, the performing a first operation corresponding to the operation control on the data analysis result comprises:

in response to a trigger operation on the full-screen control, displaying the data analysis result in full screen.

16. The non-transitory computer-readable medium according to claim 8, wherein the data display method further comprises:

in response to a close operation on the first intelligent object page, closing the first intelligent object page while expanding and displaying the configuration panel on the data query page.

17. The non-transitory computer-readable medium according to claim 8, wherein a first configuration control is displayed on the data query page, and the data display method further comprises:

in response to a trigger operation on the first configuration control, modifying a data display manner of the first data chart while keeping a chart type of the first data chart, and updating the first configuration control to a view control; and in response to a trigger operation on the view control, displaying an information panel in a floating manner on a layer above the data query page, wherein the information panel is used for displaying modification description information about the data display manner.

18. The non-transitory computer-readable medium according to claim 17, wherein a second configuration control is displayed on the information panel, the second configuration control is configured to perform or undo modification on the data display manner, and after the data display manner of the first data chart is modified, the second configuration control is displayed in an enabled state, and the data display method further comprises:

when the second configuration control is displayed in the enabled state, in response to a trigger operation on the second configuration control, displaying the second configuration control in a disabled state, and undoing the modification on the data display manner based on the modification description information; and when the second configuration control is displayed in the disabled state, in response to a trigger operation on the second configuration control, displaying the second configuration control in the enabled state, and modifying the data display manner of the first data chart based on the modification description information.

19. The non-transitory computer-readable medium according to claim 8, wherein the data display method further comprises:

after the first data chart is displayed, in response to data analysis information for the first data chart that is input on the first intelligent object page, displaying a data analysis result and an operation control for the data analysis result on the first intelligent object page, wherein the data analysis result is obtained by analyzing data in the first data chart based on the data analysis information; and in response to a trigger operation on the operation control, performing a first operation corresponding to the operation control on the data analysis result.

20. The non-transitory computer-readable medium according to claim 19, wherein the displaying an operation control for the data analysis result on the first intelligent object page comprises:

displaying a save control for the data analysis result on the first intelligent object page; and in response to the trigger operation on the operation control, the performing a first operation corresponding to the operation control on the data analysis result comprises:

in response to a trigger operation on the save control, displaying a result save page; and in response to save information configured on the result save page, saving the data analysis result according to the save information.

* * * * *